(12) United States Patent
Schroeder et al.

(10) Patent No.: US 9,663,145 B2
(45) Date of Patent: May 30, 2017

(54) VEHICLE FRAME ASSEMBLY AND METHOD OF USE AND MANUFACTURE THEREOF

(71) Applicant: Honda Motor Co., Ltd., Tokyo (JP)

(72) Inventors: Dustin Schroeder, Milford Center, OH (US); Dustin Lee Hinders, Lakeview, OH (US); Lee N. Bowers, Springfield, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/857,504

(22) Filed: Sep. 17, 2015

(65) Prior Publication Data

US 2017/0080977 A1    Mar. 23, 2017

(51) Int. Cl.

| B62D 21/02 | (2006.01) |
|---|---|
| B62D 21/11 | (2006.01) |
| B62D 65/12 | (2006.01) |
| B60G 3/20 | (2006.01) |
| B62D 63/02 | (2006.01) |

(52) U.S. Cl.
CPC ............... B62D 21/11 (2013.01); B60G 3/20 (2013.01); B62D 21/02 (2013.01); B62D 63/025 (2013.01); B62D 65/12 (2013.01); *B60G 2200/144* (2013.01); *B60G 2202/135* (2013.01)

(58) Field of Classification Search
CPC ........ B62D 21/02; B62D 21/11; B62D 65/12; B62D 63/025; B60G 3/202; B60G 3/20; B60G 2200/144; B60G 2206/011; B60G 2206/0114; B60G 2202/135; B60G 21/055

USPC .............. 280/788, 124.109, 124.128
See application file for complete search history.

(56) References Cited

U.S. PATENT DOCUMENTS

| 4,139,072 | A | 2/1979 | Dawson |
| 5,458,359 | A | 10/1995 | Brandt |
| 6,109,630 | A | 8/2000 | Dazy et al. |
| 7,434,822 | B2 | 10/2008 | Takahashi et al. |
| 8,251,438 | B2 | 8/2012 | Linden et al. |
| 8,827,020 | B2 | 9/2014 | Deckard et al. |
| 2005/0173180 | A1* | 8/2005 | Hypes .................... B60K 17/16 180/292 |
| 2007/0138755 | A1 | 6/2007 | Copsey et al. |
| 2014/0251712 | A1* | 9/2014 | Brady .................... B62D 21/11 180/291 |

OTHER PUBLICATIONS

Alston Race Cars 2015 Product Catalog.

* cited by examiner

*Primary Examiner* — Keith J Frisby
(74) *Attorney, Agent, or Firm* — Kenealy Vaidya LLP

(57) ABSTRACT

Some embodiments are directed to a vehicle frame assembly configured to accommodate different first and second suspension system configurations via mounting fixtures. The vehicle frame assembly can include a main frame assembly, and a frame assembly connected to and extending away from the main frame assembly. Multiple mounting locations can be provided on at least one of the main frame assembly and the frame assembly, each of the mounting locations being configured to accommodate one of the mounting fixtures. The mounting locations can include a first set configured for use with the first suspension system configuration, and a second set configured for use with the second suspension system configuration.

10 Claims, 8 Drawing Sheets

VEHICLE FRAME ASSEMBLY AND METHOD OF USE AND MANUFACTURE THEREOF

BACKGROUND

The disclosed subject matter relates to a vehicle frame assembly, and methods of use and manufacture thereof. More particularly, the disclosed subject matter relates to methods and apparatus for a vehicle frame assembly that can accommodate a plurality of different configurations of a suspension system for a single wheel of the vehicle.

Four-wheeled vehicles can include a suspension system for each wheel of the vehicle. The pair of front wheels can be connected to the vehicle by a single suspension system (for example, a system that includes a solid axle connected to each front wheel), or alternatively each of the front wheels can be connected to the vehicle by an respective independent suspension system (for example, a system that includes a double wishbone configuration). The pair of rear wheels can be similarly connected to the vehicle. The suspension system used for the front wheels can be the same as or different from the suspension system used for the rear wheels.

A suspension system can include a knuckle, a wheel hub connected to the knuckle and rotatably supporting a wheel, at least one link movably connecting the knuckle to the vehicle, a spring connected to the link or to the knuckle, and a damper connected to the link or to the knuckle. These components can be arranged in a plurality of different configurations in order to provide different levels of ride comfort, dynamic performance, vehicle weight, etc.

SUMMARY

Related art vehicle frames may be subject to various disadvantages. For example, a vehicle frame that can accommodate a solid axle rear suspension system may not be able to accommodate an independent rear suspension system without requiring significant modifications to the vehicle frame, and vice-versa. This level of modification can be costly, time consuming and can add significant weight to the vehicle. This added weight can reduce the dynamic performance and fuel efficiency for the vehicle. It is therefore common to manufacture separate vehicle frames to accommodate each type of suspension system, e.g., requiring production of one unique vehicle frame for a solid axle suspension system and a different unique frame for an independent suspension system.

It may therefore be beneficial to provide a vehicle frame assembly that addresses at least one of the above and/or other disadvantages of the related art. In particular, it may be beneficial to provide and/or utilize a common frame assembly, e.g., a vehicle frame assembly that can accommodate at least two different configurations of a suspension system for a particular wheel of the vehicle with reduced or minimal modification to the frame assembly, or even without any modification to the frame assembly, and/or with reduced or minimal weight penalty. For example, it may be beneficial for a frame assembly to accommodate at least two different configurations of a suspension system to provide two different models of vehicle that can differ in cost and/or performance in order to meet different market demands.

Some embodiments are therefore directed to a vehicle frame assembly configured to accommodate different first and second suspension system configurations via mounting fixtures. The vehicle frame assembly can include a main frame assembly, and a frame assembly connected to and extending away from the main frame assembly. Multiple mounting locations can be provided on at least one of the main frame assembly and the frame assembly, each of the mounting locations being configured to accommodate one of the mounting fixtures. The mounting locations can include a first set configured for use with the first suspension system configuration, and a second set configured for use with the second suspension system configuration.

Some other embodiments are directed to a vehicle configured to accommodate different first and second suspension system configurations via mounting fixtures. The vehicle can include a frame assembly including a main frame assembly, and a frame assembly connected to and extending away from the main frame assembly. Multiple mounting locations can be provided on at least one of the main frame assembly and the frame assembly, each of the mounting locations being configured to accommodate one of the mounting fixtures. The mounting locations can include a first set configured for use with the first suspension system configuration, and a second set configured for use with the second suspension system configuration. A lower lateral link can be connected to the frame assembly at one of the mounting locations. An upper lateral link can be connected to the frame assembly at another of the mounting locations. A trailing arm can be connected to one of the mounting locations on at least one of the main frame assembly and the frame assembly.

Still other embodiments are directed to a method of configuring a vehicle frame assembly to accommodate different first and second suspension system configurations via mounting fixtures. The method can include connecting a frame assembly to a main frame assembly so as to extend away from the main frame assembly; providing multiple mounting locations on at least one of the main frame assembly and the frame assembly; and configuring each of the mounting locations to accommodate one of the mounting fixtures, the mounting locations including a first set configured for use with the first suspension system configuration, and a second set configured for use with the second suspension system configuration.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Figure 1:
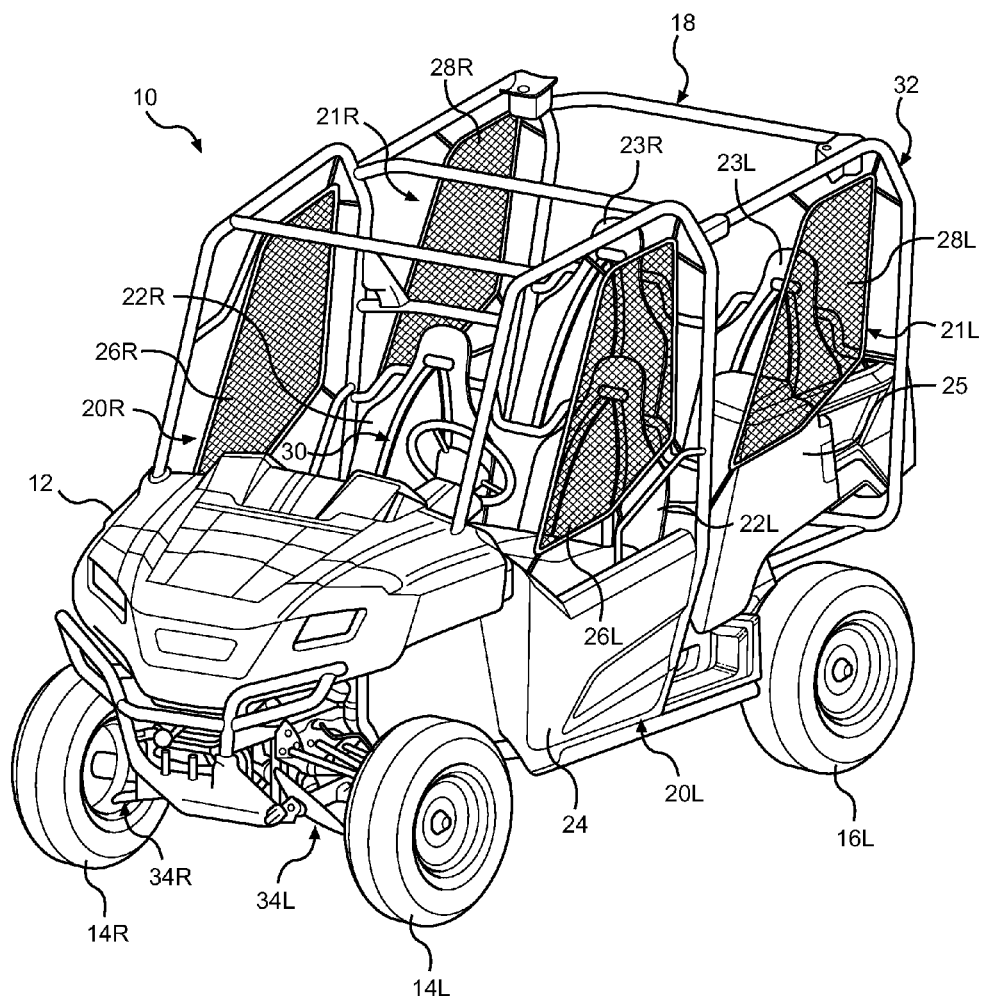
FIG. 1 is a perspective view of an exemplary vehicle including a common frame assembly in accordance with the disclosed subject matter.

FIG. 1 illustrates an embodiment of a vehicle 10 that can include a frame assembly made in accordance with the principles of the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (S×S, or S×S ATV).

However, the disclosed frame assembly can be used with any vehicle that is configured for travel along any one or combination of improved, unimproved, and unmarked paths. For example, embodiments are intended to include or otherwise cover any type of vehicle or automobile, including a passenger car, minivan, truck, other types of all-terrain vehicles (ATV), semi-tractor, off-highway vehicle, etc. In fact, embodiments are intended to include or otherwise cover configurations of the common frame assembly for use in still other types of vehicles, such as an autonomous wheeled vehicle, a non-motorized wheeled vehicle, a continuous tracked vehicle (such as but not limited to a military tank, bulldozer, and farm tractor), etc.

The vehicle 10 can include a body 12, a pair of front wheels, 14L, 14R, a pair of rear wheels 16L, 16R, a roll cage 18, a pair of front door assemblies 20L, 20R, a pair of rear door assemblies 21L, 21R, a frame assembly 32, a pair of front suspension assemblies 34L, 34R, a pair of rear suspension assemblies and a powertrain. The right rear wheel 16R, the rear suspension assemblies and the powertrain are hidden from view in FIG. 1 by the body 12. The frame assembly 32 can include the roll cage 18. As will be discussed in detail below, the frame assembly 32 can accommodate at least two different configurations of a suspension system for at least one wheel, and in some cases for each rear wheel 16L, 16R of the vehicle 10. Thus, the frame assembly 32 can be used to produce different models of vehicles with reduced or minimal modification, or even without any modification to the frame assembly 32.

The vehicle 10 can include a pair of front seats 22L, 22R and a pair of rear seats 23L, 23R mounted in a passenger area of the vehicle 10. The roll cage 18 can be configured to extend around and above the seats 22L, 22R, 23L, 23R and the passenger area. The roll cage 18 can cooperate with the body 12 and/or at least a portion of the frame assembly 32 to define a pair of door openings through which a passenger may pass in order to enter or exit the passenger area.

The front door assemblies 20L, 20R can each include a door 24 and a front window panel assembly 26L, 26R, and can be configured to selectively open and close access through the door openings by moving between a closed position and a fully opened position. The rear door assemblies 21L, 21R can each include a door 25 and a rear window panel assembly 28L, 28R, and can be configured to selectively open and close access through the door openings by moving between a closed position and a fully opened position. In the closed position, the door assemblies 20L, 20R, 21L, 21R can span the respective door openings to obstruct access to the passenger area via the door openings. In the closed position, the front portion of each door assembly 20L, 20R, 21L, 21R can be latched to the roll cage 18. The fully opened position can be any position where the door assemblies 20L, 20R, 21L, 21R are pivoted away from the respective door openings to provide substantially unobstructed access to the passenger area via the door openings. FIG. 1 shows the door assemblies 20L, 20R, 21L, 21R in the closed position.

Each seat 22L, 22R, 23L, 23R of the vehicle 10 also can include a vehicular seat belt assembly 30, and/or other structures that may be relevant or beneficial.

II. Frame Assembly

Figure 2:
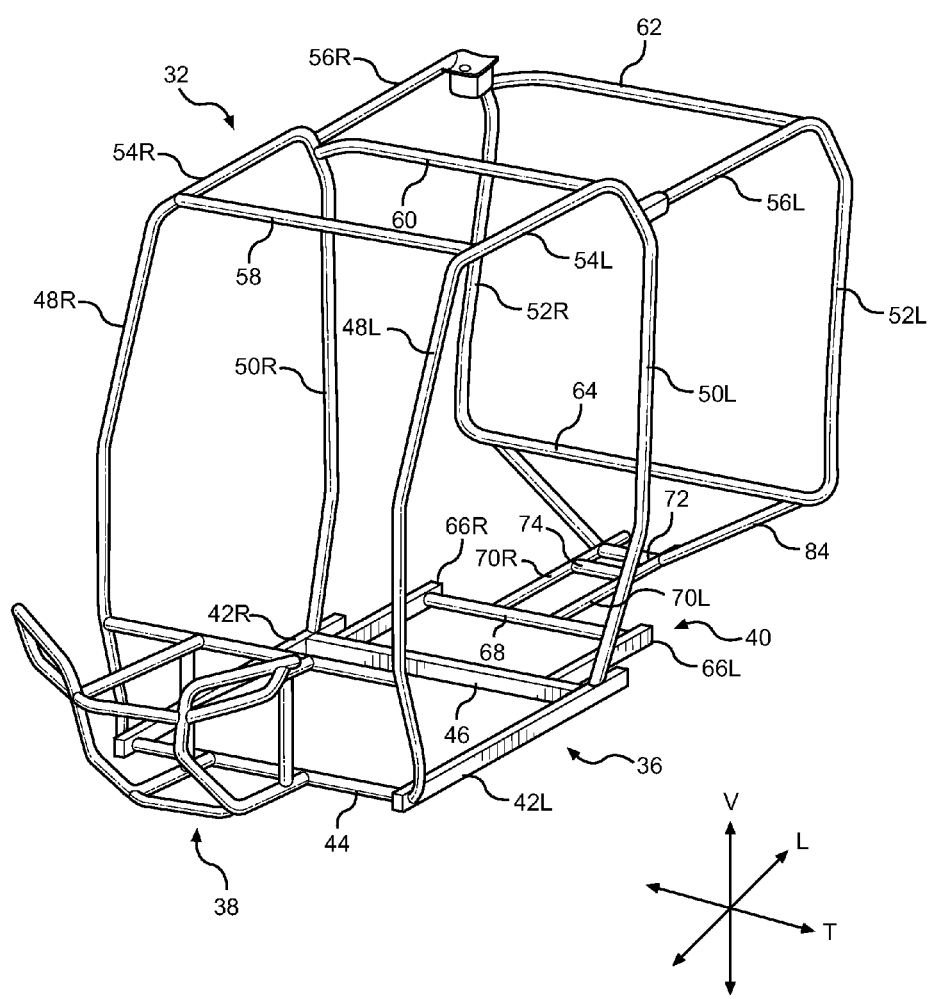
FIG. 2 is a perspective view of a frame assembly of the vehicle of FIG. 1.

FIG. 2 illustrates a partially assembled embodiment of the frame assembly 32. FIG. 2 is intended to be a schematic showing a simplified structure of certain components of the frame assembly 32 to provide a basic understanding of the overall assembly. However, this schematic is not intended to represent some or all specific details of the components that are shown. For example, FIGS. 3-8 show further details of the rear frame assembly 40, which can alternatively or additionally be applied to the front frame assembly 38.

The frame assembly 32 can be formed from a plurality of structural elements connected together in any appropriate manner to provide a unitary frame assembly. For clarity of the description of the frame assembly 32, the unitary frame assembly 32 can be considered to include three portions: a main frame assembly 36, a front frame assembly 38 and a rear frame assembly 40, although the exemplary embodiments of FIGS. 1-8 show the frame assembly 32 to be a unitary whole. Portions of the rear frame assembly 40 are omitted from FIG. 2 for simplicity and clarity of the drawing. However, exemplary embodiments are intended to include or otherwise cover a main frame assembly 36, a front frame assembly 38 and a rear frame assembly 40 that can be assembled as separate sub-assemblies that are subsequently connected together in any appropriate manner such as but not limited to mechanical fasteners, welding, or adhesive bonding, in order to form the unitary frame assembly 32.

The main frame assembly 36 can define the passenger area of the vehicle 10. The main frame assembly 36 can be configured to support the front and rear seats 22L, 22R, 23L, 23R. The seat belt assemblies 30 can be connected directly or indirectly to the main frame assembly 36. The main frame assembly 36 can include the roll cage 18, a pair of longitudinal members 42L, 42R and a plurality of cross members 44, 46. The roll cage 18 can be connected to the longitudinal members 42L, 42R.

The roll cage 18 can include a pair of A-pillars 48L, 48R, a pair of B-pillars 50L, 50R, a pair of C-pillars 52L, 52R, a pair of front rails 54L, 54R, a pair of rear rails 56L, 56R, and a plurality of cross members 58, 60, 62, 64. Each of these portions of the roll cage 18 can be made from individual members that can be connected together in any appropriate manner, such as but not limited to welding, mechanical fasteners, adhesive, etc., or they can be integrally or unitarily formed. For example, embodiments are also intended to include a roll cage 18 made by bending a single length of tubing to form the A-pillar, B-pillar, C-pillar, front rail and rear rail for each side of the roll cage 18, etc.

The longitudinal members 42L, 42R can extend in the longitudinal direction L of the vehicle 10, from the front of the passenger area to the rear of the passenger area. The longitudinal members 42L, 42R can each be configured as a substantially straight, hollow beam having a substantially rectangular cross-sectional shape.

The cross members 44, 46 can extend in the transverse direction T of the vehicle 10, from the left longitudinal member 42L to the right longitudinal member 42R. The cross members 44, 46 can be spaced apart in the longitudinal direction L of the vehicle 10. The first cross member 44 can be connected to the longitudinal members 42L, 42R adjacent the front ends of the longitudinal members 42L, 42R, which may be adjacent the front ends. The second cross member 46 can be connected to the longitudinal members 42L, 42R adjacent the rear ends of the longitudinal members 42L, 42R.

The front frame assembly 38 can be connected to the front end of the main frame assembly 36. Exemplary embodiments are intended to include a front frame assembly 38 connected to at least the first cross member 44. The front frame assembly 38 can be configured with mounting points for the front suspension assemblies 34L, 34R and any other appropriate components/systems, such as but not limited to portions of the body 12, a front differential assembly, steering system components, front bumper assembly, etc.

The rear frame assembly 40 can be connected to the rear end of the main frame assembly 36. As will be discussed in detail below, the rear frame assembly 40 can be configured with mounting points for the rear suspension assemblies and any other appropriate components/systems, such as but not limited to portions of the body 12, a rear differential assembly, a rear bumper assembly, etc.

Portions of the frame assembly 32, such as the main frame assembly 36, front frame assembly 38 and rear frame assembly 40, can be made from any appropriate structural element(s), such as but not limited to tubes, beams, stampings, etc., that can provide sufficient strength and rigidity for a vehicle passenger area. The frame assembly 32 can be formed from a single type of structural element, or alternatively can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 32 can be formed from any appropriate material, such as but not limited to steel, aluminum, titanium, magnesium, fiber-reinforced plastic, carbon fiber, a composite formed from any combination of these exemplary materials, etc. Each structural element of the frame assembly 32 can be connected to each other, such as adjoining structural elements, in any appropriate manner, such as but not limited to mechanical fasteners, welding, adhesive, any combination thereof, etc.

A. Overall Suspension Assembly Configurations

As will be discussed in detail below, the main frame assembly 36 and the rear frame assembly 40 can include a plurality of mounting locations configured to provide attachment points for elements of both of a first configuration of a suspension assembly and a second configuration of a suspension assembly. Each suspension assembly can include any appropriate combination of a wheel hub, a knuckle, a damper, a spring, a stabilizer bar (also referred to as a anti-roll bar) and at least one link. The at least one link can be movably connected to each of the knuckle and one of the plurality of mounting locations.

Figure 3:
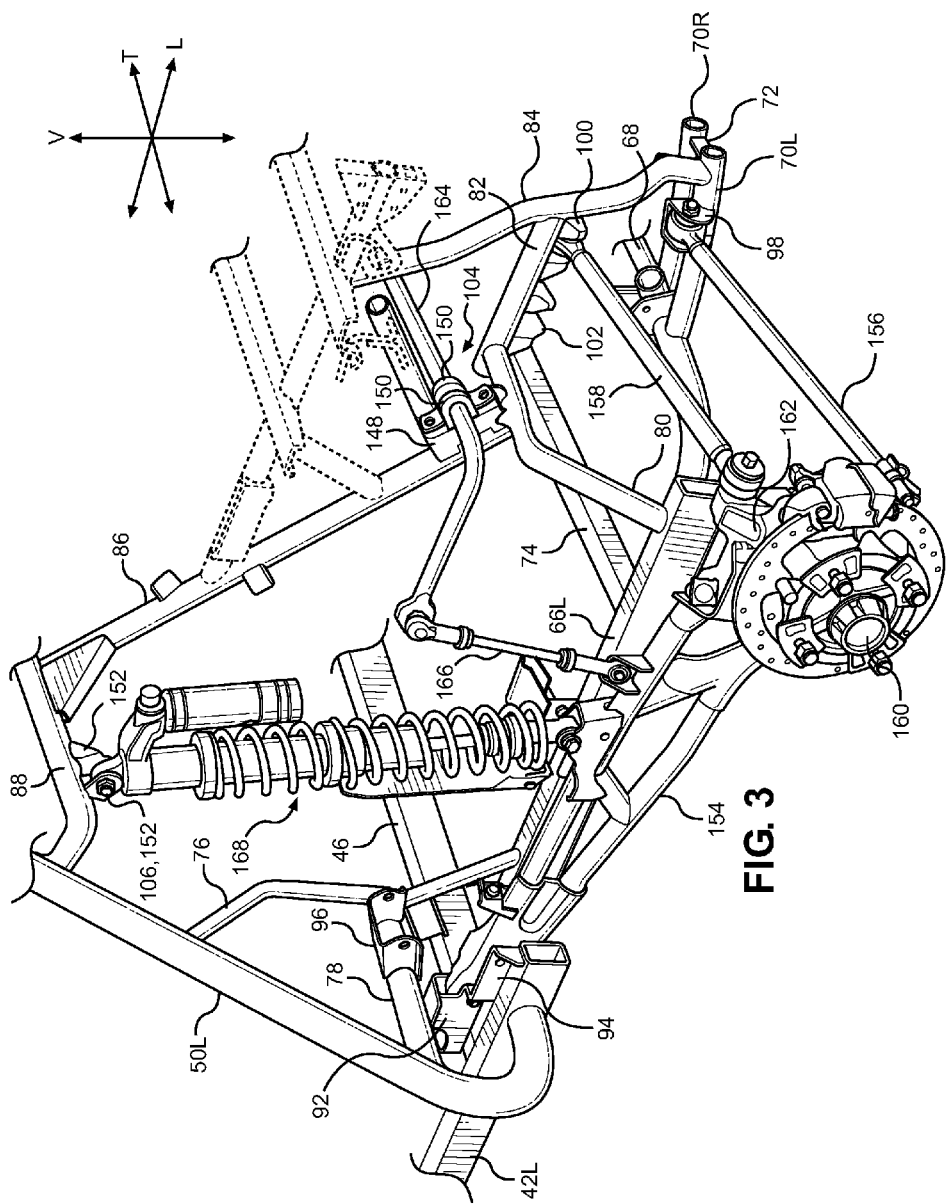
FIG. 3 is a rear perspective view of the frame assembly that can accommodate a first configuration of a suspension assembly in accordance with the disclosed subject matter.
Figure 4:
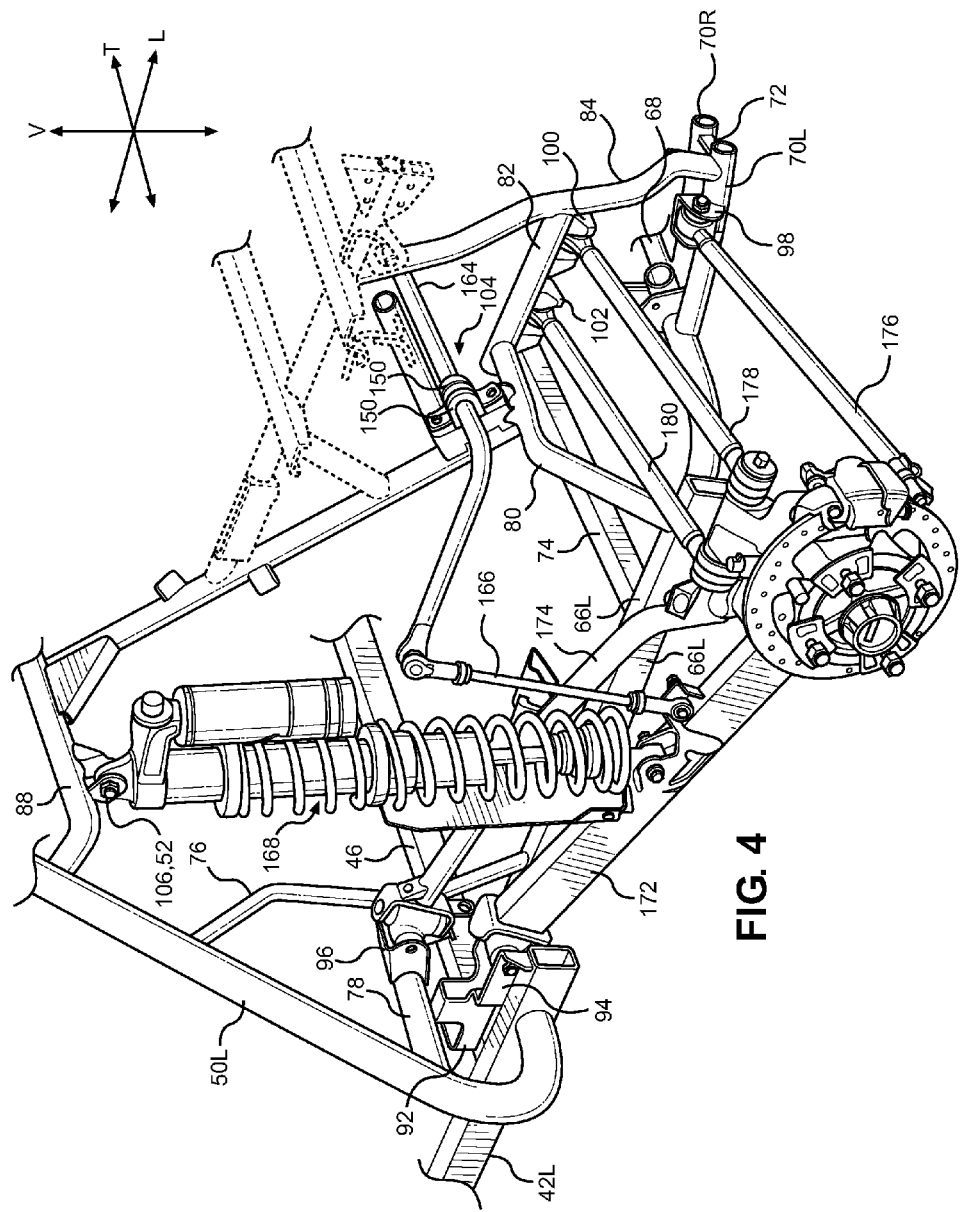
FIG. 4 is a rear perspective view of the frame assembly that can accommodate a second configuration of a suspension assembly in accordance with the disclosed subject matter.
Figure 5:
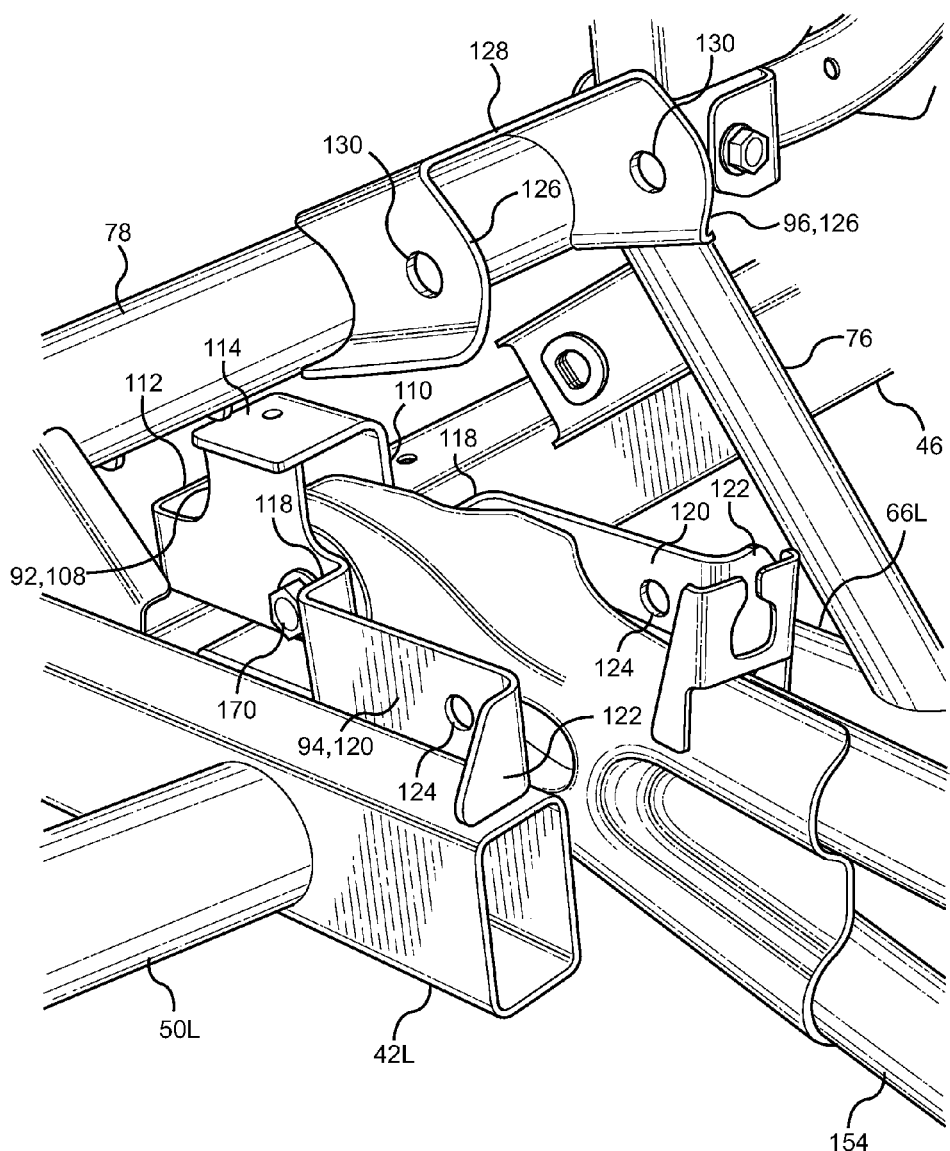
FIG. 5 is an enlarged view of a portion of the frame assembly and the first configuration of a suspension assembly of FIG. 3.
Figure 6:
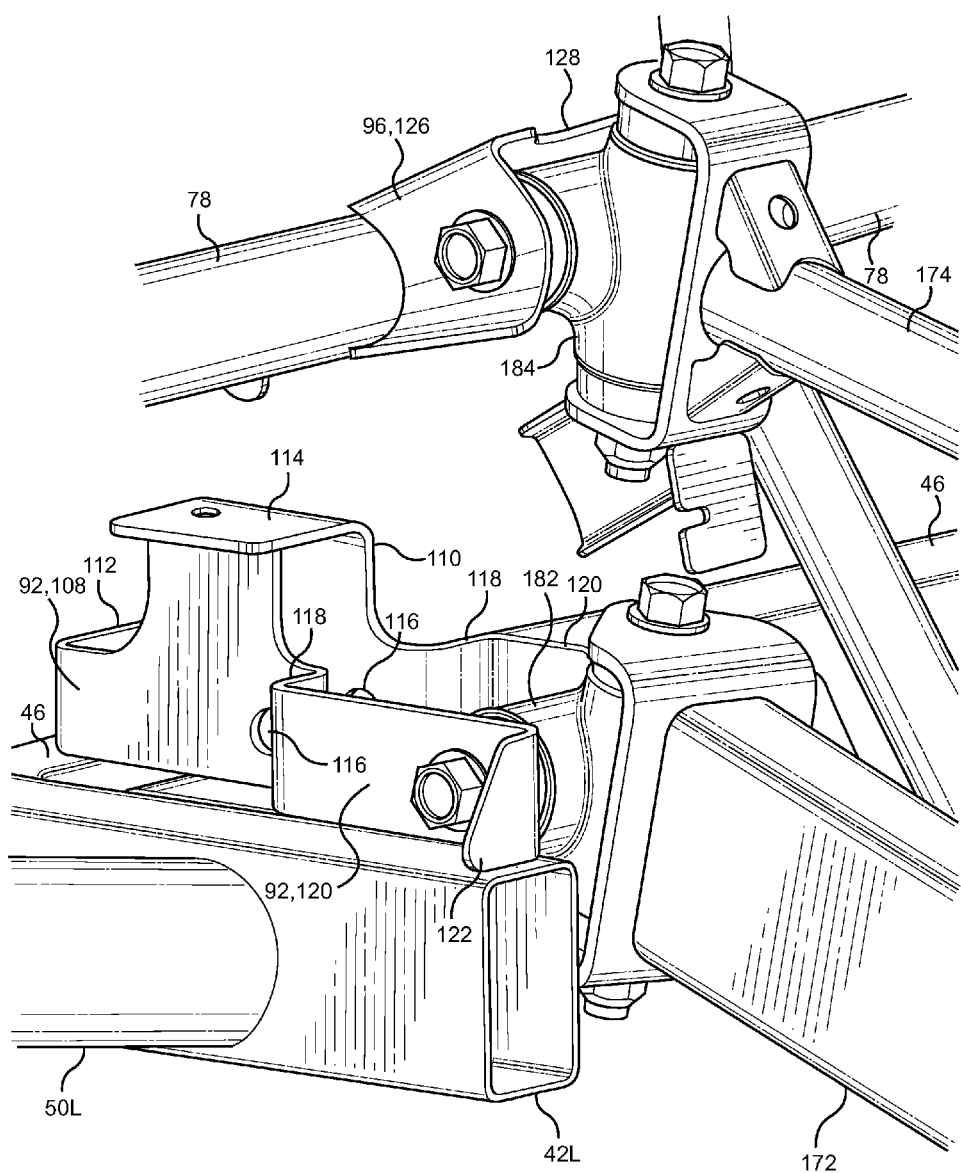
FIG. 6 is an enlarged view of a portion of the frame assembly and the second configuration of a suspension assembly of FIG. 4.
Figure 7:
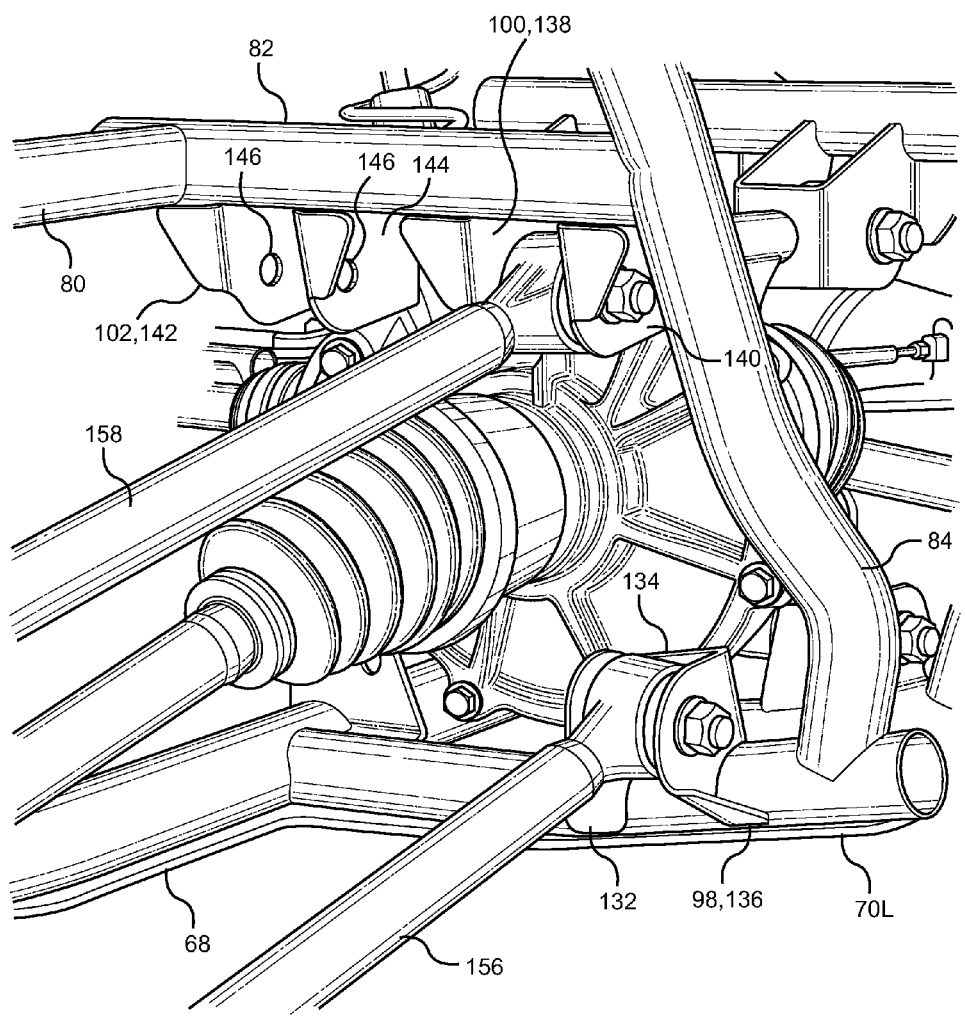
FIG. 7 is an enlarged view of another portion of the frame assembly and the first configuration of a suspension assembly of FIG. 3.
Figure 8:
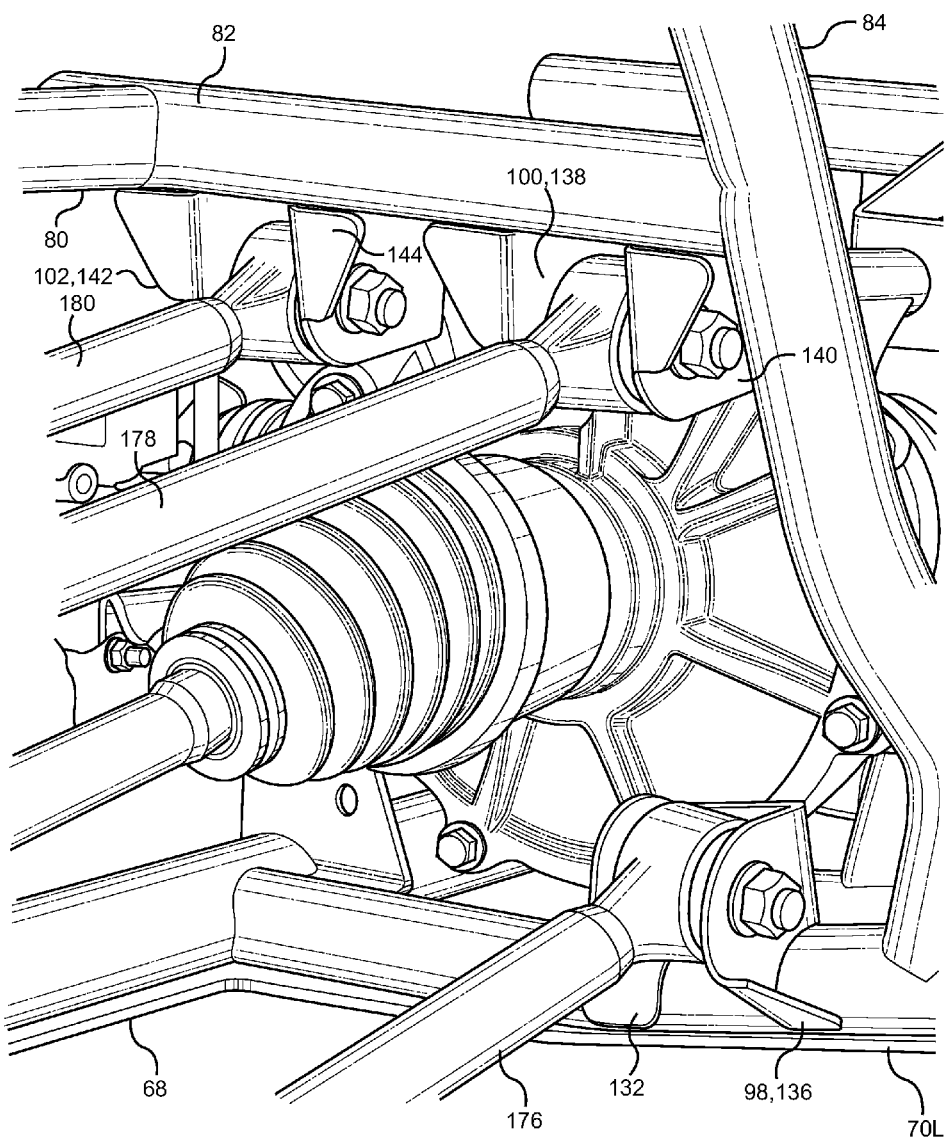
FIG. 8 is an enlarged view of another portion of the frame assembly and the second configuration of a suspension assembly of FIG. 4.

The first configuration can be any suspension assembly, such as but not limited to a swing arm suspension assembly, a double wishbone (also referred to as an A-arm) suspension assembly, a multi-link suspension assembly having a plurality of links of any number and orientation, a twist beam (also referred to as a torsion beam) suspension assembly, a strut suspension assembly, a solid axle suspension assembly, etc. The second configuration can be any suspension assembly referenced above that is different than the first configuration. In the exemplary embodiments shown in FIGS. 1-8 and described herein, the main frame assembly 36 and the rear frame assembly 40 can include mounting locations for a first configuration of a suspension assembly that can be referred to as a 3-link suspension assembly, as shown in FIGS. 3, 5 and 7, and can also include mounting locations for a second configuration of a suspension system that can be referred to as a 5-link suspension configuration, as shown in FIGS. 4, 6, and 8.

A first set of the plurality of mounting locations can be selected to provide mounting points for the first configuration of the suspension assembly to the vehicle 10. A second set of the plurality of mounting locations can be selected to provide mounting points for the second configuration of the suspension assembly to the vehicle 10.

In some embodiments, one or more of the mounting locations of the first set can be common to one or more of the mounting locations of the second set. For example, the first set of mounting locations can include at least one of the mounting locations of the second set. However, alternative exemplary embodiments are intended to include a first set of the plurality of mounting locations that is mutually exclusive to a second set of the plurality of mounting locations, e.g., where none of the mounting locations of the first and second sets are common.

B. Rear Frame Assembly

Referring to FIG. 2, the rear frame assembly 40 can include a pair of second longitudinal members 66L, 66R, a third cross member 68, a pair of third longitudinal members 70L, 70R, a fourth cross member 72 and a fifth cross member 74.

The second longitudinal members 66L, 66R can extend in the longitudinal direction L, and can each be configured as a substantially straight, hollow beam having a substantially rectangular cross-sectional shape. The front ends of the second longitudinal members 66L, 66R can be connected to the second cross member 46 of the main frame assembly 36. The second longitudinal members 66L, 66R can be spaced inboard of the longitudinal members 42L, 42R in the transverse direction T. Exemplary embodiments are intended to include any appropriate orientation of the second longitudinal members 66L, 66R relative to the longitudinal members 42L, 42R.

The third cross member 68 can extend in the transverse direction T of the vehicle 10 from the left second longitudinal member 66L to the right second longitudinal member 66R. The third cross member 68 can be connected to the second longitudinal members 66L, 66R adjacent their rear ends. The third cross member 68 can be configured as a hollow, circular cross-section tube that is bent into a generally U-shape with the upturned ends extending along the second longitudinal members 66L, 66R, respectively, as shown in FIGS. 3, 4, 7 and 9. As indicated above, the depictions of FIG. 2 are merely schematic and not intended to show all details of the various components. Exemplary embodiments are intended to include a third cross member 68 configured in any appropriate exterior shape and/or cross-sectional shape.

The third longitudinal members 70L, 70R can extend in the longitudinal direction L and away from the third cross member 68. One end of each of the third longitudinal members 70L, 70R can be connected to the third cross member 68 at respective locations of a middle portion of the third cross member 68. The third longitudinal members 70L, 70R can be spaced apart in the transverse direction T. Each of the third longitudinal members 70L, 70R can be configured as a substantially straight tube, such as having a circular cross-section. Exemplary embodiments are intended to include third longitudinal members 70L, 70R configured in any appropriate exterior shape and cross-sectional shape.

The fourth cross member 72 can extend in the transverse direction T from the left third longitudinal member 70L to the right longitudinal member 70R. One end of the fourth cross member 72 can be connected to the left longitudinal member 70L at a location adjacent the rear end of the left longitudinal member 70L. The other end of the fourth cross member 72 can be connected to the right longitudinal member 70R at a location adjacent the rear end of the right longitudinal member 70R. The fourth cross member 72 can be configured as a substantially rectangular, flat plate. Exemplary embodiments are intended to include a fourth cross member 72 configured in any appropriate exterior shape and cross-sectional shape.

As shown in FIG. 2, the fifth cross member 74 can extend in the transverse direction T from the left third longitudinal member 70L to the right third longitudinal member 70R. One end of the fifth cross member 74 can be connected to the left third longitudinal member 70L and the other end of the fifth cross member 74 can be connected to the right third longitudinal member 70R. The fifth cross member 74 can lie intermediate the third cross member 68 and the fourth cross member 72 in the longitudinal direction L. The third cross member 68, fourth cross member 72 and fifth cross member 74 can extend substantially parallel to each other. The fifth cross member 74 can be configured as a substantially straight, hollow, square cross-section beam.

However, the fifth cross member 74 can be provided at other locations. For example, as shown in FIGS. 3 and 4, the fifth cross member 74 is shown as extending between the second longitudinal members 66L, 66R in the longitudinal direction L, and between the second and third cross members 46, 48 in the transverse direction T.

The longitudinal members 42L, 42R, the second cross member 46, the second longitudinal members 66L, 66R, the third cross member 68, the third longitudinal members 70L, 70R, the fourth cross member 72 and the fifth cross member 74 can be arranged to lie at substantially the same level in the vertical direction V. However, embodiments are intended to include other dispositions of these elements, such as any combination of these features arranged at different vertical levels than at least one other of these features.

FIGS. 3-8 illustrate the left second longitudinal member 66L, the third cross member 68, the third longitudinal members 70L, 70R, the fourth cross member 72, the fifth cross member 74 (at a different location than FIG. 2) and additional features of the rear frame assembly 40. FIGS. 3-8 illustrate the left side of the rear frame assembly 40 and features of exemplary left suspension configurations. It is to be understood that the right side of the rear frame assembly 40 and the right suspension configurations can be configured as mirror images of the left side of the rear frame assembly 40 and the left suspension configurations shown in FIGS. 3-8.

As shown by FIGS. 3 and 4, the rear frame 40 can include a first mount member 76, a second mount member 78, a third mount member 80, a fourth mount member 82, a fifth mount member 84, a sixth mount member 86 and a seventh mount member 88. The mount members 76, 78, 80, 82, 84, 86 88 can be configured as hollow tubes having a circular cross-section. Exemplary embodiments are intended to include any appropriate exterior shape and cross-sectional shape.

The first mount member 76 can extend generally in the vertical direction V of the vehicle 10 from the second longitudinal member 66L to the B-pillar 50L. One end of the first mount member 76 can be connected to the second longitudinal member 66L at a location on the second longitudinal member 66L adjacent the front end of the second longitudinal member 66L. The other end of the first mount member 76 can be connected to the B-pillar 50L of the roll cage 18 at a location spaced above the junction of the longitudinal member 42L with the B-pillar 50L. The first mount member 76 can be formed with any appropriate exterior shape such as but not limited to the double kink shape depicted in FIGS. 3-6.

The second mount member 78 can extend generally in the transverse direction T from the B-pillar 50L to the first mount member 76. The second mount member 78 can be spaced rearward from the second cross member 46 in the longitudinal direction L. The second mount member 78 can be arranged at a level spaced above the level of the second cross member 46 when measured in the vertical direction V. One end of the second mount member 78 can be connected to the B-pillar 50L at a location on the B-pillar 50L intermediate the junction of the longitudinal member 42L with the B-pillar 50L and the junction of the first mount member 76 with the B-pillar 50L. The other end of the second mount member 78 can be connected to the first mount member 76. The second mount member 78 can be formed with any appropriate shape such as but not limited to the straight exterior shape depicted in FIGS. 3-6.

The third mount member 80 can extend generally in the vertical direction V and the transverse direction T. The third mount member 80 can include a first portion that can extend away from the second longitudinal member 66L generally in the longitudinal direction L and the transverse direction T. The third mount member 80 can include another portion that can extend toward the fourth mount member 82 generally in the transverse direction T and that can lie at a level above the level of the second longitudinal member 66L when measured in the vertical direction V. The third mount member 80 can lie at a position rearward of the second mount member 78 when measured in the longitudinal direction L. One end of the third mount member 80 can be connected to the second longitudinal member 66L adjacent the rear end of the second longitudinal member 66L. The other end of the third mount member 80 can be connected to the fourth mount member 82. The third mount member 80 can be formed with any appropriate shape such as but not limited to the single bend exterior shape depicted in FIGS. 3 and 4.

The fourth mount member 82 can extend generally in the longitudinal direction L from the third mount member 80 to the fifth mount member 84. The fourth mount member 82 can lie at a level above the level of the second longitudinal member 66L when measured in the vertical direction V. The fourth mount member 82 can lie at a position inward of the second longitudinal member 66L when measured in the transverse direction T. The fourth mount member 82 can lie at a position outward of the third longitudinal member 70L when measured in the transverse direction T. One end of the fourth mount member 82 can be connected to the third mount member 80. The other end of the fourth mount member 82 can be connected to the fifth mount member 84. The fourth mount member 82 can be formed with any appropriate shape such as but not limited to the substantially straight exterior shape depicted in FIGS. 3, 4, 7 and 8.

The fifth mount member 84 can extend generally in the vertical direction V from the left third longitudinal member 70L to any appropriate frame structure, such as but not limited to the cross member 64 of the roll cage 18 as depicted in FIG. 2, or the frame assembly shown in phantom for supporting a cargo area as depicted in FIGS. 3 and 4. The fifth mount member 84 can lie at a position rearward of the third mount member 80 when measured in the longitudinal direction L. The fifth mount member 84 can be formed with any appropriate shape such as but not limited to a substantially straight shape as depicted in FIG. 2 or with multiple bends as depicted in FIGS. 3 and 4.

The sixth mount member 86 can extend generally in the longitudinal direction L and the vertical direction V from the third mount member 80 to the seventh mount member 88. The sixth mount member 86 can lie at a level above the second longitudinal member 66L. The sixth mount member 86 can lie at a position inward of the second longitudinal member 66L when measured in the transverse direction T. The sixth mount member 86 can lie at a position outward of the fourth mount member 82 when measured in the transverse direction T. One end of the sixth mount member 86 can be connected to the third mount member 80 at a location intermediate the two ends of the third mount member 80. Embodiments are intended to include connecting one end of the sixth mount member 86 intermediate the bend in the third mount member 80 and the end of the third mount member 80 that is connected to the fourth mount member 82. The other end of the sixth mount member 86 can be connected to the seventh mount member 88 adjacent one end of the seventh mount member 88. The sixth mount member 86 can be formed with any appropriate shape such as but not limited to the substantially straight exterior shape depicted in FIGS. 3 and 4.

The seventh mount member 88 can extend generally in the transverse direction T from the left B-pillar 50L of the roll cage 18 to the right B-pillar 50R of the roll cage 18. The seventh mount member 88 can lie at a level above each of the second cross member 46, the second mount member 78, the third mount member 80 and the fourth mount member 82 when measured in the vertical direction V. The seventh mount member 88 can lie at a position rearward of the second cross member 46 when measured in the longitudinal direction L. One end of the seventh mount member 88 can be connected to the left B-pillar 50L at a location spaced above the junction of the first mount member 76 and the left B-pillar 50L. The other end of the seventh mount member 88 can be similarly connected to the right B-pillar 50R. The seventh mount member 88 can be formed with any appropriate shape such as but not limited to the substantially straight exterior shape with two bent ends as depicted in FIGS. 3 and 4.

C. Suspension Mounting Locations and Fixtures

In the exemplary embodiments of FIGS. 1-8, the main frame assembly 36 and the rear frame assembly 40 can provide eight total combined mounting locations. Each of a plurality of mounting fixtures 92, 94, 96, 98, 100, 102, 104, 106 can be connected to the appropriate one of the main frame assembly 36 and the rear frame assembly 40 at a respective one of the plurality of mounting locations. FIGS. 3 and 4 show each of the plurality of mounting locations that can be provided by the main frame assembly 36 and the rear frame assembly 40 that are selectively usable by at least two different suspension configurations. FIGS. 5 and 6 show three mounting locations of the plurality of mounting locations that can be provided by the main frame assembly 36 and the rear frame assembly 40. FIGS. 7 and 8 show another three of the plurality of mounting locations that can be provided by the rear frame assembly 40.

Each of the mounting fixtures 92, 94, 96, 98, 100, 102, 104, 106 can be connected to the respective members in any appropriate manner such as but not limited to welding, mechanical fastener(s), adhesive, integral molding with the respective member, etc. Each of the mounting fixtures 92, 94, 96, 98, 100, 102, 104, 106 can be configured as a bracket that can be formed from a flat plate that can be bent and machined into the desired shape. The first mounting fixture 92 and the second mounting fixture 94 can be integrally formed from the same flat plate. Embodiments are intended to include mounting fixtures formed in any appropriate shape and by any appropriate process such as but not limited to stamping, casting, extrusion, forging, machining from a three-dimensional blank, etc.

FIGS. 5 and 6 are enlarged views of a front portion of FIGS. 3 and 4, respectively, and show further details of the first, second and third mounting fixtures 92, 94, 96. The longitudinal member 42L can extend beyond the second cross member 46 and along a portion of the second longitudinal member 66L. The longitudinal member 42L, second longitudinal member 66L and second mount member 78 can cooperate to provide first, second and third mounting locations selectively usable by at least two different suspension configurations.

At the first mounting location, the first mounting fixture 92 can be connected to the second cross member 46. The second mounting fixture 94 can be connected to the longitudinal member 42L and the second longitudinal member 66L at the second mounting location. The third mounting fixture 96 can be connected to the second mount member 78 at the third mounting location.

The second mounting location can lie at a level that is substantially the same as the level of the first mounting location when measured in the vertical direction. The second mounting location can be spaced rearward of the first mounting location when measured in the longitudinal direction L.

The third mounting location can lie at a level spaced above each of the first and second mounting locations as measured in the vertical direction V. The third mounting location can lie at a position substantially aligned with the first mounting location when measured in the longitudinal direction L. The third mounting location can be spaced forward of the second mounting location when measured in the longitudinal direction L.

The first mounting fixture 92 can be centered in the transverse direction T about the gap between the longitudinal member 42L and the second longitudinal member 66L. The first mounting fixture 92 can be connected to the second cross member 46. The first mounting fixture 92 can include a pair of side walls 108, 110, a front wall 112, and a top wall 114.

The side walls 108, 110 can be spaced apart in the transverse direction T, and can extend generally in the longitudinal direction L and the vertical direction V. The side walls 108, 100 can be connected to the second cross member 46. The side walls 108, 110 can extend away from the second cross member 46 generally in the vertical direction V. The side walls 108, 110 can extend generally toward the second mount member 78. Each of the side walls 108, 110 can include a hole 116 (See FIG. 6).

The front wall 112 can extend in the vertical direction V and the transverse direction T between the sidewall portions 108, 110. The front wall 112 can be connected to each of the side walls 108, 110. The front wall 112 can be connected to the second cross member 46. The front wall 112 can extend away from the second cross member 46 generally in the vertical direction V. The front wall 112 can extend generally toward the second mount member 78. The front wall 112 can be shorter than side walls 108, 110 when measured in the vertical direction V.

The top wall 114 can extend along top edges of the side walls 108, 110. The top wall 114 can be connected to each of the side walls 108, 110. The top wall 114 can be separated from the front wall 112 by a space.

The first mounting fixture 92 and the second mounting fixture 94 can be centered about an axis extending in the longitudinal direction L. The second mounting fixture 94 can be spaced rearward from the first mounting fixture 92 in the longitudinal direction L. The second mounting fixture 94 can be connected to the first mounting fixture 92. The second mounting fixture can be connected to the longitudinal member 42L and the second longitudinal member 66L. The second mounting fixture 94 can include a pair of front walls 118, a pair of side walls 120 and a pair of rear walls 122.

The front walls 118 can be connected to a respective one of the side walls 108, 110 of the first mounting fixture 92. The front walls 118 can extend away from one of the respective side walls 108, 110 generally in the transverse direction T. The front walls 118 can extend generally in the vertical direction V away from the longitudinal member 42L and the second longitudinal member 66L generally toward the second mount member 78. The front walls 118 can be shorter than the side walls 108, 110 of the first mounting fixture 92 when measured in the vertical direction V.

The side walls 120 can extend rearward from a respective one of the front walls 118 in the longitudinal direction L. The side walls 120 can be spaced apart by a distance greater than that by which the side walls 108, 110 of the first mounting fixture 92 are spaced apart when measured in the transverse direction T. The side walls 120 can be shorter than the side walls 108, 110 of the first mounting fixture 92 when measured in the vertical direction V. The sidewalls 120 can be connected to a respective one of the front walls 118. The sidewalls 120 can be connected to and extend along a respective one of the longitudinal member 42L and the second longitudinal member 66L. The side walls 120 can extend away from the respective one of the longitudinal member 42L and the second longitudinal member 66L generally in the vertical direction V toward the third mounting fixture 96. Each of the side walls 120 can include a hole 124 (See FIG. 5). The holes 124 can be spaced rearward in the longitudinal direction from the holes 116 of the first mounting fixture 92.

The rear walls 122 can be connected to and can extend away from a respective one of the side walls 120 in the transverse direction T. The rear walls 122 can be connected to a respective one of the longitudinal member 42L and the second longitudinal member 66L. The rear walls 122 can extend away from the respective one of the longitudinal member 42L and the second longitudinal member 66L generally in the vertical direction V generally toward the third mount fixture 96. The rear walls 122 can be shorter than the side walls 108, 110 of the first mounting fixture 92 when measured in the vertical direction V.

The third mounting fixture 96 can be connected to the second mount member 78 at a location on the second mount member 78 that is closer to the first mount member 76 than to the B-pillar 50L of the roll cage 18. The third mounting fixture 96 can include a pair of side walls 126 and a top wall 128.

The side walls 126 can extend in the vertical direction V and the longitudinal direction L. Each of the side walls 126 can include a flange portion that is bent outwardly from the interior of the third mounting fixture 96. The flange portions can extend generally in the transverse direction T. The side walls 126 can be connected to the second mount member 78 and to the top wall 128. Each of the side walls 126 can include a hole 130.

The top wall 128 can extend generally in the longitudinal direction L and the transverse direction T. The top wall 128 can be connected to the second mount member 78.

FIGS. 3, 4, 7 and 8 show that the third longitudinal member 70L can provide the fourth mounting location, and the fourth mount member 82 can provide the fifth and sixth mounting locations. The fourth mounting fixture 98 can be connected to the third longitudinal member 70L at the fourth mounting location. The fifth and sixth mounting fixtures 100, 102 can be connected to the fourth mount member 82 at the fifth and sixth mounting locations, respectively.

Each of the fourth, fifth and sixth mounting locations can spaced rearward of each of the first, second and third mounting locations when measured in the longitudinal direction L. Each of the fourth, fifth and sixth mounting locations can spaced inward of each of the first, second and third mounting locations when measured in the transverse direction T. The fourth mounting location can lie at substantially the same level as the first and second mounting locations when measured in the vertical direction V. The fifth and sixth mounting locations can lie at a level above the first, second and fourth mounting locations when measured in the vertical direction V. The fifth and sixth mounting locations can lie at a level above the fourth mounting location when measured in the vertical direction V. The fifth mounting location can be substantially aligned with the fourth mounting location when measured in the longitudinal direction L. The sixth mounting location can lie at a position that is spaced forward of the fourth and fifth mounting locations when measured in the longitudinal direction. The sixth mounting location can lie at a position intermediate the second mounting location and the fifth mounting location when measured in the longitudinal direction L.

FIGS. 7 and 8 are enlarged views of a rear portion of FIGS. 3 and 4, respectively, and show further details of the fourth, fifth and sixth mounting fixtures 98, 100, 102.

The fourth mounting fixture 98 can include a front wall 132, a side wall 134 and a rear wall 136. Each of the walls 132, 134, 136 can be connected to the third longitudinal member 70L at the fourth mounting location. Each of the walls 132, 134, 136 can extend away from the third longitudinal member 70L generally in the vertical direction V generally toward the fourth mount member 82. The front wall 132 and the rear wall 136 can extend generally in the transverse direction T. The rear wall 136 can be spaced from the front wall 132 in the longitudinal direction L. The side wall 134 can extend generally in the longitudinal direction L from the front wall 132 to the rear wall 136. The side wall 134 can be connected to each of the front wall 132 and the rear wall 136. Each of the front wall 132 and the rear wall 136 can include a hole.

The fifth mounting fixture 100 can be configured in a like manner as the fourth mounting fixture 98 to include a front wall 138, a side wall (obstructed from view) and a rear wall 140. Each of the walls 138, 140 (and the side wall) can be connected to the fourth mount member 82 at the fifth mounting location. Each of the walls 138, 140 (and the side wall) can extend away from the fourth mounting member 82 generally in the vertical direction V generally toward the third longitudinal member 70L. The front wall 138 and the rear wall 140 can extend generally in the transverse direction T. The rear wall 140 can be spaced from the front wall 138 in the longitudinal direction L. The side wall can extend generally in the longitudinal direction L from the front wall 138 to the rear wall 140. The side wall can be connected to each of the front wall 138 and the rear wall 140. Each of the front wall 138 and the rear wall 140 can include a hole.

The sixth mounting fixture 102 can be configured in a like manner as the fourth mounting fixture 98 to include a front wall 142, a side wall (obstructed from view) and a rear wall 144. Each of the walls 142, 144 (and the side wall) can be connected to the fourth mount member 82 at the sixth mounting location. Each of the walls 142, 144 (and the side wall) can extend away from the fourth mounting member 82 generally in the vertical direction V. Each of the walls 142, 144 (and the side wall) can extend generally toward the third longitudinal member 70L. The front wall 142 and the rear wall 144 can extend generally in the transverse direction T. The rear wall 144 can be spaced from the front wall 142 in the longitudinal direction L. The side wall can extend generally in the longitudinal direction L from the front wall 142 to the rear wall 144. The side wall can be connected to each of the front wall 142 and the rear wall 144. Each of the front wall 142 and the rear wall 144 can include a hole 146.

FIGS. 3 and 4 show that the sixth mount member 86 can provide the seventh mounting location. The seventh mounting fixture 104 can be connected to the sixth mount member 86 at the seventh mounting location.

The seventh mounting location can lie at a level above each of the first, second, third, fourth, fifth and sixth mounting locations when measured in the vertical direction V. The seventh mounting location can be spaced rearward of each of the first, second and third mounting positions when measured in the longitudinal direction L. The seventh mounting location can be spaced forward of each of the fourth, fifth and sixth mounting positions when measured in the longitudinal direction L. The seventh mounting location can be spaced inward from the first, second and third mounting locations when measured in the transverse direction T. The seventh mounting location can be spaced outward from the fourth, fifth and sixth mounting locations when measured in the transverse direction T.

The seventh mounting fixture 104 can include a base member 148 and a pair of projections 150.

The base member 148 can be connected to the sixth mount member 86 at the seventh mounting location. The base member 148 can have an elongated shape that is substantially U-shaped in cross-section along the longitudinal direction L. The base member 148 can extend generally in the vertical direction V, the transverse direction T and the longitudinal direction L. The base member 148 can extend along a portion of the length of the sixth mount member 86. The base member 148 can extend away from the junction of the sixth mount member 86 with the third mount member 80 toward the seventh mount member 88.

The projections 150 can extend away from the base member 148 generally upward in the vertical direction V and generally rearward in the longitudinal direction L. The projections 150 can be spaced apart in the transverse direction T. Each of the projections 150 can include a hole.

FIGS. 3 and 4 show that the seventh mount member 88 can provide the eighth mounting location. The eight mounting fixture 106 can be connected to the seventh mount member 88 at the eighth mounting location.

The eighth mounting location can lie at a level above each of the first, second, third, fourth, fifth, sixth and seventh mounting locations when measured in the vertical direction V. The eighth mounting location can be spaced rearward of each of the first, second and third mounting positions when measured in the longitudinal direction L. The seventh mounting location can be spaced forward of each of the fourth, fifth, sixth and seventh mounting positions when measured in the longitudinal direction L. The eighth mounting location can be generally aligned with the first, second and third mounting locations when measured in the transverse direction T. The seventh mounting location can be spaced outward from the fourth, fifth, sixth and seventh mounting locations when measured in the transverse direction T.

The eighth mounting fixture 106 can have a similar construction as the fourth mounting fixture 98 to include a pair of side walls 152 and a front wall (obstructed from view). Each of the side walls 152 (and the front wall) can be connected to the seventh mount member 88 at the eighth mounting location. Each of the side walls 152 (and the front wall) can extend away from the seventh mounting member 88 generally in the vertical direction V and generally in the longitudinal direction L. Each of the side walls 152 (and the front wall) can extend generally toward the second longitudinal member 66L. The side walls 152 can be spaced apart in the transverse direction T. The front wall can extend generally in the transverse direction T from one side wall 152 to the other side wall 152. The front wall can be connected to each of the side walls 152. Each of the side walls 152 can include a hole.

III. First Configuration of a Suspension Assembly

FIGS. 3, 5 and 7 show a first configuration of a suspension assembly connected to the frame assembly 32 at the left rear of the vehicle 10. The first configuration of a suspension assembly can be referred to as a 3-link suspension assembly. The 3-link suspension assembly can include a plurality of links 154, 156, 158 totaling three, a wheel hub 160, a knuckle 162, a stabilizer bar 164, a connecting link 166, and a cushion 168.

The links 154, 156, 158 can be configured as a trailing arm 154, a lower lateral link 156 and an upper lateral link 158. The knuckle 162 can be connected to the wheel hub 160. The wheel hub 160 can rotatably support the left rear wheel 16L and the left rear brake on the knuckle 162. The knuckle 162 can include a plurality of mounting fixtures, one for each of the trailing arm 154, the lower lateral link 156 and the upper lateral link 158.

The trailing arm 154 can extend from the first mounting location to the knuckle 162 generally in the longitudinal direction L. The trailing arm 154 can pass through the second mounting location and through the second mounting fixture 94. The trailing arm 154 can be connected to the knuckle 162 in any appropriate manner, such as but not limited to a mechanical fastener (with or without) bushings that can permit movement of the trailing arm 154 relative to the knuckle 162. The trailing arm 154 can be connected to the frame assembly 32 at the first mounting location in any appropriate manner, such as but not limited to mechanical fasteners (with or without bushings) that can permit at least one degree of freedom of movement of the trailing arm 154 relative to the frame assembly 32.

FIGS. 3 and 5 show the trailing arm 154 connected to the first mounting fixture 92 by a pivot assembly 170 that can provide a spherical rotation point between the frame assembly 32 and the trailing arm 154. The pivot assembly 170 can be bolted to the holes 116 formed in the first mounting fixture 92.

The lower lateral link 156 can extend from the fourth mounting location to the knuckle 162 generally in the transverse direction T. FIGS. 3 and 7 show that the lower lateral link 156 can be bolted to the fourth mounting fixture 98 via the holes formed in the fourth mounting fixture. Embodiments are intended to include the lower lateral link 156 connected to the fourth mounting fixture 98 and to the knuckle 162 in any appropriate manner, such as but not limited to mechanical fasteners (with or without bushings) that can permit at least one degree of freedom of movement of the lower lateral link 156 relative to each of the frame assembly 32 and the knuckle 162.

The upper lateral link 158 can extend from the fifth mounting location to the knuckle 162 generally in the transverse direction T. FIGS. 3 and 7 show that the upper lateral link 158 can be bolted to the fifth mounting fixture 100 via the holes formed in the fifth mounting fixture. Embodiments are intended to include the upper lateral link 158 connected to the fifth mounting fixture 100 and to the knuckle 162 in any appropriate manner, such as but not limited to mechanical fasteners (with or without bushings) that can permit at least one degree of freedom of movement of the upper lateral link 158 relative to each of the frame assembly 32 and the knuckle 162.

The stabilizer bar 164 can be connected to the frame assembly 32 at the seventh mounting location. The connecting link 166 can connect the left end of the stabilizer bar 164 to the trailing arm 154.

The stabilizer bar 164 can extend in the transverse direction T from the left rear suspension assembly to the right rear suspension assembly. The stabilizer bar 164 can be connected to the seventh mounting location positioned on the right side of the frame assembly 32. Another connecting link can connect the right end of the stabilizer bar 164 to the trailing arm 154 of the right rear suspension system. Because the stabilizer bar 164 is connected to the trailing arms of both rear suspensions assemblies, the stabilizer bar can limit roll of the frame assembly 32 about the longitudinal axis of the vehicle 10.

The cushion 168 can include a coil spring and a damper (also referred to as a shock absorber or shock) extending inside of the coil spring. The cushion 168 can extend from the eighth mounting location to the trailing arm 154. The cushion 168 can be connected to the eighth mounting fixture 96 and to a mounting fixture provided on the trailing arm 154 in any appropriate manner, such as but not limited to mechanical fasteners (with or without bushings) that can permit at least two degrees of freedom of movement of the cushion 168 relative to each of the frame assembly 32 and the trailing arm 154.

The frame assembly 32 can thereby accommodate a suspension assembly having a first configuration corresponding to a 3-link suspension system that can use the first, fourth and fifth, seventh and eighth mounting fixtures 92, 98, 100, 104, 106 mounted to the frame assembly 32 at the first, fourth, fifth, seventh and eighth mounting locations.

The second, third and sixth mounting locations are not used by the exemplary 3-link suspension system disclosed above, and thus the second, third and sixth mounting fixtures 94, 96 and 102 can be omitted. Nonetheless, the frame assembly 32 can still provide the second, third and sixth mounting locations. In other words, the above structure can be used to accommodate other types of suspensions.

IV. Second Configuration of a Suspension Assembly

FIGS. 4, 6 and 8 show a second configuration of a suspension assembly connected to the frame assembly 32 at the left rear of the vehicle 10. The second configuration of a suspension assembly can be referred to as a 5-link suspension assembly. The 5-link suspension assembly can include a plurality of links 172, 174, 176, 178, 180 totaling five. The wheel hub 160, the knuckle 162, the stabilizer bar 164, the connecting link 166, and the cushion 168 of the exemplary 3-link suspension system can be common to the exemplary 5-link suspension system.

The links 172, 174, 176, 178, 180 can be configured as a lower trailing arm 172, an upper trailing arm 174, a lower lateral link 176, an upper lateral link 178 and a toe control link 180.

The lower trailing arm 172 can extend from the second mounting location to the knuckle 162 generally in the longitudinal direction L. The lower trailing arm 172 can be connected to the knuckle 162 in any appropriate manner, such as but not limited to a mechanical fastener (with or without bushings) that can permit movement of the lower trailing arm 172 relative to the knuckle 162. The lower trailing arm 172 can be connected to the frame assembly 32 at the second mounting location in any appropriate manner, such as but not limited to mechanical fasteners (with or without bushings) that can permit at least one degree of freedom of movement of the lower trailing arm 172 relative to the frame assembly 32.

FIGS. 4 and 6 show the lower trailing arm 172 connected to the second mounting fixture 94 by a pivot assembly 182 that can provide rotation of the lower trailing arm about the longitudinal axis of the vehicle 10. The pivot assembly 182 can be bolted to the holes 124 formed in the second mounting fixture 94.

The upper trailing arm 174 can extend from the third mounting location to the knuckle 162 generally in the longitudinal direction L. The upper trailing arm 174 can be connected to the knuckle 162 in any appropriate manner, such as but not limited to a mechanical fastener (with or without bushings) that can permit movement of the upper trailing arm 174 relative to the knuckle 162. The upper trailing arm 174 can be connected to the frame assembly 32 at the third mounting location in any appropriate manner, such as but not limited to mechanical fasteners (with or without bushings) that can permit at least one degree of freedom of movement of the upper trailing arm 174 relative to the frame assembly 32.

FIGS. 4 and 6 show the upper trailing arm 174 connected to the third mounting fixture 96 by a pivot assembly 184 that can provide rotation of the upper trailing arm 174 about the longitudinal axis of the vehicle 10. The pivot assembly 184 can be bolted to the holes 130 formed in the third mounting fixture 96.

The lower lateral link 176 can extend from the fourth mounting location to the knuckle 162 generally in the transverse direction T. FIGS. 4 and 8 show that the lower lateral link 176 can be bolted to the fourth mounting fixture 98 via the holes formed in the fourth mounting fixture 98. Embodiments are intended to include the lower lateral link 176 connected to the fourth mounting fixture 98 and to the knuckle 162 in any appropriate manner, such as but not limited to mechanical fasteners (with or without bushings) that can permit at least one degree of freedom of movement of the lower lateral link 176 relative to each of the frame assembly 32 and the knuckle 162.

The upper lateral link 178 can extend from the fifth mounting location to the knuckle 162 generally in the transverse direction T. FIGS. 4 and 8 show that the upper lateral link 158 can be bolted to the fifth mounting fixture 100 via the hole formed in the fifth mounting fixture. Embodiments are intended to include the upper lateral link 178 connected to the fifth mounting fixture 100 and to the knuckle 162 in any appropriate manner, such as but not limited to mechanical fasteners (with or without bushings) that can permit at least one degree of freedom of movement of the upper lateral link 178 relative to each of the frame assembly 32 and the knuckle 162.

The toe control link 180 can extend from the sixth mounting location to the knuckle 162 generally in the transverse direction T. FIGS. 4 and 8 show the toe control link 180 can be bolted to the sixth mounting fixture 100 via the holes 146 formed in the sixth mounting fixture 102. Embodiments are intended to include the toe control link 180 connected to the sixth mounting fixture 102 and to the knuckle 162 in any appropriate manner, such as but not limited to mechanical fasteners (with or without bushings) that can permit at least one degree of freedom of movement of the toe control link 180 relative to each of the frame assembly 32 and the knuckle 162.

The stabilizer bar 164 can be connected to the frame assembly 32 at the seventh mounting location. The connecting link 166 can connect the left end of the stabilizer bar 164 to the lower trailing arm 172.

The stabilizer bar 164 can extend in the transverse direction T from the left rear suspension assembly to the right rear suspension assembly. The stabilizer bar 164 can be connected to the seventh mounting location positioned on the right side of the frame assembly 32. Another connecting link can connect the right end of the stabilizer bar 164 to the trailing arm of the right rear suspension system. Because the stabilizer bar 164 is connected to the trailing arms of both rear suspension assemblies, the stabilizer bar 164 can limit roll of the frame assembly 32 about the longitudinal axis of the vehicle 10.

The cushion 168 can include a coil spring and a damper (also referred to as a shock absorber or shock) extending inside of the coil spring. The cushion 168 can extend from the eighth mounting location to the lower trailing arm 172. The cushion 168 can be connected to the eighth mounting fixture 96 and to a mounting fixture provided on the lower trailing arm 172 in any appropriate manner, such as but not limited to mechanical fasteners (with or without bushings) that can permit at least two degrees of freedom of movement of the cushion 168 relative to each of the frame assembly 32 and the trailing arm 154.

Thus, the frame assembly 32 can accommodate a suspension assembly having a configuration corresponding to a 5-link suspension system that can use the second, third, fourth, fifth, sixth, seventh and eighth mounting fixtures 94, 96, 98, 100, 102, 104, 106 mounted to the frame assembly 32 at the second, third, fourth, fifth, sixth, seventh and eighth mounting locations.

The first mounting location may not be used by the exemplary 5-link suspension system, and thus the first mounting fixture 92 can be omitted. Nonetheless, the frame assembly 32 can still provide the second, third and sixth mounting locations. In other words, the above structure can be used to accommodate other types of suspensions.

In view of the forgoing, it is apparent that the frame assembly 32 can be used to accommodate at least two different models of vehicles with reduced or minimal modification, or even without any modification, to the frame assembly 32. Further, the frame assembly 32 can reduce or avoid cost and weight penalties, and can enhance or maximize fuel efficiency across the different models because the frame assembly 32 includes all of the mounting locations for each different configuration of a suspension system for a particular wheel.

Although FIGS. 3 and 4 show the cushion 68 connected to upper portion of the trailing arm 154 and the lower trailing arm 178, respectively, exemplary embodiments are intended to include or otherwise cover the cushion 168 connected to any appropriate suspension member, such as but not limited to the knuckle 162, the upper portion of the trailing arm 154 of FIG. 3, or the upper trailing arm 174 of FIG. 4.

The vehicle 10 can include a power source and a transmission configured to drive the front wheels 14L, 14R and/or the rear wheels 16L, 16R. The power source and the transmission can be mounted on the frame assembly 32. In the exemplary embodiments of FIGS. 1-8, the power source can be connected to the frame assembly 32 at a position between front wheels 14L, 14R and the rear wheels 16L, 16R. In this exemplary embodiment, the stabilizer bar 164 can extend in the transverse direction T at a location rearward of the power source. However, exemplary embodiments are intended to include or otherwise cover a stabilizer bar that can extend in the transverse direction T at any appropriate location in the longitudinal direction L relative to the power source, such as but not limited to a location forward of the power source or a location above the power source.

V. Other Features of the Vehicle

The power source can be an internal combustion engine, an electric motor or a hybrid of an internal combustion engine and an electric motor. The power source (configured as an internal combustion engine or a hybrid power source) can have an engine output axis that is oriented in the longitudinal direction L or in the traverse direction T of the vehicle. The engine can be mounted forward of the front axles, rearward of the rear axles, or intermediate the front and rear axles. In the exemplary embodiment of FIG. 1, the power source is configured as a longitudinally-oriented, mid-mounted internal combustion engine, and the power source can be mounted at or on at least a portion of the rear frame assembly 40.

The transmission can be an automatic transmission, a manual transmission, or a semi-automatic transmission. The transmission can include an input shaft, an output shaft, and a speed ratio assembly.

A coupling can connect the engine output shaft to the transmission input shaft. The coupling can permit selective engagement/disengagement of the transmission input shaft with the engine output shaft, or at least relative rotation of the engine output shaft with respect to the input shaft, in any appropriate manner. Exemplary couplings can include, but are not limited to, a friction disc clutch, a centrifugal clutch, and a torque converter.

The speed ratio assembly of the transmission can connect the transmission input shaft to the transmission output shaft, such that the transmission output shaft can rotate at variable speeds relative to the input shaft. The speed ratio assembly can be a stepped speed ratio assembly or a continuously variable speed ratio assembly configured in any appropriate manner.

The transmission can include a differential gear assembly that can permit one wheel connected to the differential to be driven at a different speed that another wheel connected to the transmission. The differential can be configured in any appropriate manner. The transmission and the differential can be contained in a common housing. This combination of the transmission and the differential can be referred to as a transaxle.

VI. Alternative Embodiments

While certain embodiments of the invention are described above, and FIGS. 1-8 disclose the best mode for practicing the various inventive aspects, it should be understood that the invention can be embodied and configured in many different ways without departing from the spirit and scope of the invention.

For example, embodiments are disclosed above in the context of the frame assembly 32 accommodating two different configurations of rear suspension systems shown in FIGS. 1-8. However, embodiments are intended to also or alternatively include or otherwise cover a frame assembly 32 that can accommodate more than one configuration of the front suspension system.

Embodiments are intended to include or otherwise cover a frame assembly 32 that can accommodate more than one suspension system having fewer or no common features. For example, the first configuration can be as disclosed above, and in the second configuration the stabilizer bar and the connecting link can be omitted, the coil spring can be replaced with a leaf spring or a torsion spring, and the damper can be connected to the upper trailing arm. However, the above alternative embodiments are merely provided for exemplary purposes, and as indicated above, embodiments are intended to cover any type of frame assembly 32 disclosed above.

Exemplary embodiments are intended to include or otherwise cover a frame assembly 32 that can accommodate any number of seats, including one seat, two seats in tandem, two seats spaced in the transverse direction T, or any other number of seats and seating arrangements.

Embodiments are also intended to include or otherwise cover methods of using and methods of manufacturing the frame assembly 32 and the suspension systems disclosed above. The methods of manufacturing include or otherwise cover processors and computer programs implemented by processors used to design various elements of the vehicle frame assembly disclosed above. For example, embodiments are intended to cover processors and computer programs used to design the frame assembly 32 or the configurations of suspension systems that the frame assembly 32 can accommodate.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A vehicle frame assembly configured to accommodate different first and second suspension system configurations via mounting fixtures, the vehicle frame assembly comprising:
   a main frame assembly;
   a second frame assembly extending away from the main frame assembly; and
   multiple mounting locations provided on at least one of the main frame assembly and the second frame assembly, each of the mounting locations being configured to accommodate one of the mounting fixtures, the mounting locations including a first set configured for use with the first suspension system configuration, and a second set configured for use with the second suspension system configuration;
   wherein the second frame assembly is configured for connection to first and second suspension system configurations that each include a wheel hub, knuckle, stabilizer bar, connecting link, and cushion.

2. A vehicle configured to accommodate different first and second suspension system configurations via mounting fixtures, the vehicle comprising:
   a frame assembly including a main frame assembly, and a second frame assembly connected to and extending away from the main frame assembly;
   multiple mounting locations provided on at least one of the main frame assembly and the second frame assembly, each of the mounting locations being configured to accommodate one of the mounting fixtures, the mounting locations including a first set configured for use with the first suspension system configuration, and a second set configured for use with the second suspension system configuration;
   a lower lateral link connected to the second frame assembly at one of the mounting locations;
   an upper lateral link connected to the second frame assembly at another of the mounting locations; and
   a trailing arm connected to one of the mounting locations on at least one of the main frame assembly and the second frame assembly, wherein at least one of the multiple mounting locations is not connected to any of the mounting fixtures if the vehicle is configured in one of the first and second suspension system configurations.

3. The vehicle of claim 2, wherein the first set of mounting locations includes at least one of the mounting locations of the second set.

4. The vehicle of claim 2, wherein the first set of mounting locations does not include at least one of the mounting locations of the second set.

5. The vehicle of claim 2, wherein the main frame assembly includes a pair of longitudinal members that extend along a longitudinal direction of the vehicle, and a cross member extending generally perpendicular to and connecting the longitudinal members.

6. The vehicle of claim 5, wherein the second frame assembly includes a pair of longitudinal members that extend along a longitudinal direction of the vehicle, and a cross member extending generally perpendicular to and connecting the longitudinal members.

7. The vehicle of claim 6, wherein at least one of the cross member of the main frame assembly and the cross member of the second frame assembly includes at least one of the mounting locations.

8. The vehicle of claim 7, wherein each of the longitudinal members of at least one of the main frame assembly and the second frame assembly includes at least one of the mounting locations.

9. The vehicle of claim 8, wherein the longitudinal members of the second frame assembly each includes at least one of the mounting locations.

10. A vehicle configured to accommodate different first and second suspension system configurations via mounting fixtures, the vehicle comprising:
   a frame assembly including a main frame assembly, and a second frame assembly connected to and extending away from the main frame assembly;
   multiple mounting locations provided on at least one of the main frame assembly and the second frame assembly, each of the mounting locations being configured to accommodate one of the mounting fixtures, the mounting locations including a first set configured for use with the first suspension system configuration, and a second set configured for use with the second suspension system configuration;
   a lower lateral link connected to the second frame assembly at one of the mounting locations;
   an upper lateral link connected to the second frame assembly at another of the mounting locations; and
   a trailing arm connected to one of the mounting locations on at least one of the main frame assembly and the second frame assembly, wherein
   the second frame assembly includes seven separate mount members that are configured as hollow tubes, at least one of the mount members providing at least one of the mounting locations; and
   at least one of the multiple mounting locations is not connected to any of the mounting fixtures if the vehicle is configured in one of the first and second suspension system configurations.

* * * * *